United States Patent
Kubica

(10) Patent No.: US 9,690,396 B1
(45) Date of Patent: Jun. 27, 2017

(54) PAPERLESS BLUEPRINT DRAFTING TABLE SYSTEM

(71) Applicant: Brian R. Kubica, Aspen, CO (US)

(72) Inventor: Brian R. Kubica, Aspen, CO (US)

(*) Notice: Subject to any disclaimer, the term of this patent is extended or adjusted under 35 U.S.C. 154(b) by 365 days.

(21) Appl. No.: 14/551,999

(22) Filed: Nov. 24, 2014

Related U.S. Application Data

(63) Continuation-in-part of application No. 13/326,880, filed on Dec. 15, 2011, now abandoned.

(51) Int. Cl.
| | | |
|---|---|---|
| *G06F 3/033* | (2013.01) | |
| *G06F 3/0354* | (2013.01) | |
| *A47B 21/007* | (2006.01) | |
| *A47B 27/00* | (2006.01) | |
| *G06F 3/02* | (2006.01) | |

(52) U.S. Cl.
CPC ........ *G06F 3/03545* (2013.01); *A47B 21/007* (2013.01); *A47B 27/00* (2013.01); *G06F 3/02* (2013.01); *A47B 2021/0076* (2013.01)

(58) Field of Classification Search
CPC ......... A47B 21/00–21/03; A47B 21/04; A47B 2021/0076; A47B 2200/0072–2200/0075; A47B 13/08–13/081; A47B 17/02; A47B 14/02; G06F 1/1601; G06F 1/1616–1/162; Y10S 248/92; Y10S 248/917
USPC ...................... 345/156–184; 178/18.01–20.04
See application file for complete search history.

(56) References Cited

U.S. PATENT DOCUMENTS

| | | | | |
|---|---|---|---|---|
| 2,522,296 | A * | 9/1950 | Overstedt | A47B 27/02 108/129 |
| 3,981,086 | A * | 9/1976 | Hoeflinger | G09B 1/02 312/305 |
| 4,408,850 | A | 10/1983 | Norek | |
| 4,451,895 | A | 5/1984 | Sliwkowski | |
| 4,490,777 | A | 12/1984 | Tanner et al. | |
| 4,716,542 | A | 12/1987 | Peltz et al. | |
| 4,811,243 | A | 3/1989 | Racine | |
| 5,033,804 | A * | 7/1991 | Faris | A47B 21/00 312/223.3 |
| 5,341,305 | A | 8/1994 | Clarino et al. | |
| 5,508,720 | A | 4/1996 | DiSanto et al. | |
| 5,699,225 | A * | 12/1997 | Yavitz | A47B 21/007 108/50.01 |
| D403,005 | S | 12/1998 | Herman | |
| 6,075,502 | A | 6/2000 | McDowall et al. | |
| 6,237,507 | B1 * | 5/2001 | Yanagisawa | A47B 21/0073 108/3 |
| 6,286,440 | B1 * | 9/2001 | Jyringi | A47B 21/00 108/50.01 |

(Continued)

*Primary Examiner* — Roberto Flores

(57) ABSTRACT

A paperless blueprint drafting table system for full-scale viewing, editing, and annotating of paperless blueprints features a base having a pivoting table top located thereon. The table top features a planar table top surface. A table top aperture is centrally located in the table top. The table top is located at an adjustable angle with respect to the base. The system features a transparent window located in the table top aperture having a planar window top surface. The window top surface is located flush with the table top surface on a window ledge. The window is rigid, scratch resistant, and break resistant. The system features a display screen located in the base close to the window bottom surface. The display screen displays blueprints through the window for viewing, editing, and annotating via a stylus device.

11 Claims, 4 Drawing Sheets

(56) References Cited

U.S. PATENT DOCUMENTS

| | | | |
|---|---|---|---|
| 6,418,860 B1 * | 7/2002 | Hinderhofer | A47B 21/03 108/10 |
| 6,553,919 B1 * | 4/2003 | Nevin | A47B 21/0073 108/25 |
| 6,766,282 B1 | 7/2004 | Schettine | |
| 6,805,237 B2 | 10/2004 | Curry | |
| D510,821 S * | 10/2005 | Madison | D6/655.21 |
| 6,980,088 B2 | 12/2005 | Stambaugh | |
| 7,029,079 B2 * | 4/2006 | Holt | A47B 21/00 108/50.01 |
| D521,770 S * | 5/2006 | Madison | D6/656.19 |
| 7,100,516 B2 * | 9/2006 | Riddiford | A47B 21/00 108/50.01 |
| 7,515,143 B2 * | 4/2009 | Keam | G06F 3/0421 178/18.01 |
| 7,525,538 B2 * | 4/2009 | Bathiche | G02B 5/282 345/175 |
| 7,535,489 B2 * | 5/2009 | Nonaka | G06F 3/0425 345/619 |
| 7,593,593 B2 * | 9/2009 | Wilson | G06F 3/0421 348/241 |
| 7,870,937 B1 | 1/2011 | Arnao | |
| 8,037,832 B2 * | 10/2011 | Pellegrini | A47B 21/0073 108/50.01 |
| 8,060,840 B2 * | 11/2011 | Billow | G06F 3/0481 715/750 |
| 8,356,779 B2 * | 1/2013 | Stengel | A47B 21/0073 248/125.1 |
| 8,480,188 B2 * | 7/2013 | Cao | A47B 21/0073 108/50.02 |
| 8,502,789 B2 * | 8/2013 | Tse | G06F 3/0425 345/173 |
| 8,596,728 B2 * | 12/2013 | Rozestraten | A47B 21/0073 312/319.5 |
| 8,749,959 B2 * | 6/2014 | Riley | A47B 21/0073 312/235.2 |
| 8,896,656 B2 * | 11/2014 | Epstein | H04N 5/268 348/14.05 |
| 8,898,588 B2 * | 11/2014 | Cheon | G06F 1/3231 715/747 |
| 8,902,195 B2 * | 12/2014 | McGibney | G06F 3/0386 250/224 |
| 9,103,488 B2 * | 8/2015 | Stengel | F16M 13/022 |
| 9,146,674 B2 * | 9/2015 | Karlsson | G06F 3/04883 |
| 9,298,318 B2 * | 3/2016 | Morrison | G06F 3/0425 |
| 2004/0123780 A1 | 7/2004 | Butts | |
| 2004/0123782 A1 * | 7/2004 | Korber | A47B 21/0073 108/50.01 |
| 2004/0186818 A1 | 9/2004 | Bowlus | |
| 2005/0047074 A1 | 3/2005 | Shearman | |
| 2005/0140677 A1 | 6/2005 | Chou | |
| 2005/0145142 A1 * | 7/2005 | Korber | A47B 21/0073 108/50.01 |
| 2007/0075977 A1 | 4/2007 | Chen et al. | |
| 2007/0157856 A1 * | 7/2007 | Skoog | A47B 81/061 108/70 |
| 2008/0287200 A1 * | 11/2008 | Yang | G07F 17/322 463/46 |
| 2010/0090075 A1 | 4/2010 | Griffin | |
| 2010/0103167 A1 | 4/2010 | Song et al. | |
| 2011/0168063 A1 * | 7/2011 | Rotlevi | A47B 21/00 108/50.11 |
| 2012/0250238 A1 * | 10/2012 | Cao | A47B 21/007 361/679.21 |

* cited by examiner

Side View

Cross Section

Top View

Bottom of Table Top

USReferring now to FIG. 1-6, the present invention features a paperless blueprint drafting table system (100) for full-scale viewing, editing, and annotating paperless blueprints.

PAPERLESS BLUEPRINT DRAFTING TABLE SYSTEM

CROSS REFERENCE

This application claims priority to U.S. patent application Ser. No. 13/326,880 filed Dec. 15, 2011, the specification(s) of which is/are incorporated herein in their entirety by reference.

FIELD OF THE INVENTION

The present invention relates to drafting tables, paperless blueprint drafting table systems, and methods of using paperless blueprint drafting table systems for efficiency.

BACKGROUND OF THE INVENTION

Historically, construction blueprints have been handled in paper form. Paper is slow, expensive, and wasteful whereas digital blueprints reduce costs and increase efficiency. The present invention features a paperless blueprint drafting table system for full-scale viewing, editing, and annotating of paperless blueprints.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a paperless blueprint drafting table system for full-scale viewing, editing, and annotating of paperless blueprints. In some embodiments, the system comprises a base having a pivoting table top disposed thereon. In some embodiments, the table top comprises a planar table top surface and a table bottom surface. In some embodiments, a table top aperture is centrally disposed in the table top. In some embodiments, the table top is disposed at an adjustable angle with respect to the base.

In some embodiments, the system comprises a transparent window disposed in the table top aperture having a planar window top surface and a window bottom surface. In some embodiments, the window top surface is disposed flush with the table top surface on a window ledge. In some embodiments, the window is rigid, scratch resistant, and break resistant.

In some embodiments, the system comprises a display screen disposed in the base close to the window bottom surface. In some embodiments, the display screen is operatively connected to a microprocessor. In some embodiments, the display screen is operatively connected to a power supply. In some embodiments, the display screen is operatively connected to a storage medium.

In some embodiments, the display screen displays blueprints through the window for viewing, editing, and annotating via a stylus device.

DESCRIPTION OF PREFERRED EMBODIMENTS

Figure 1:
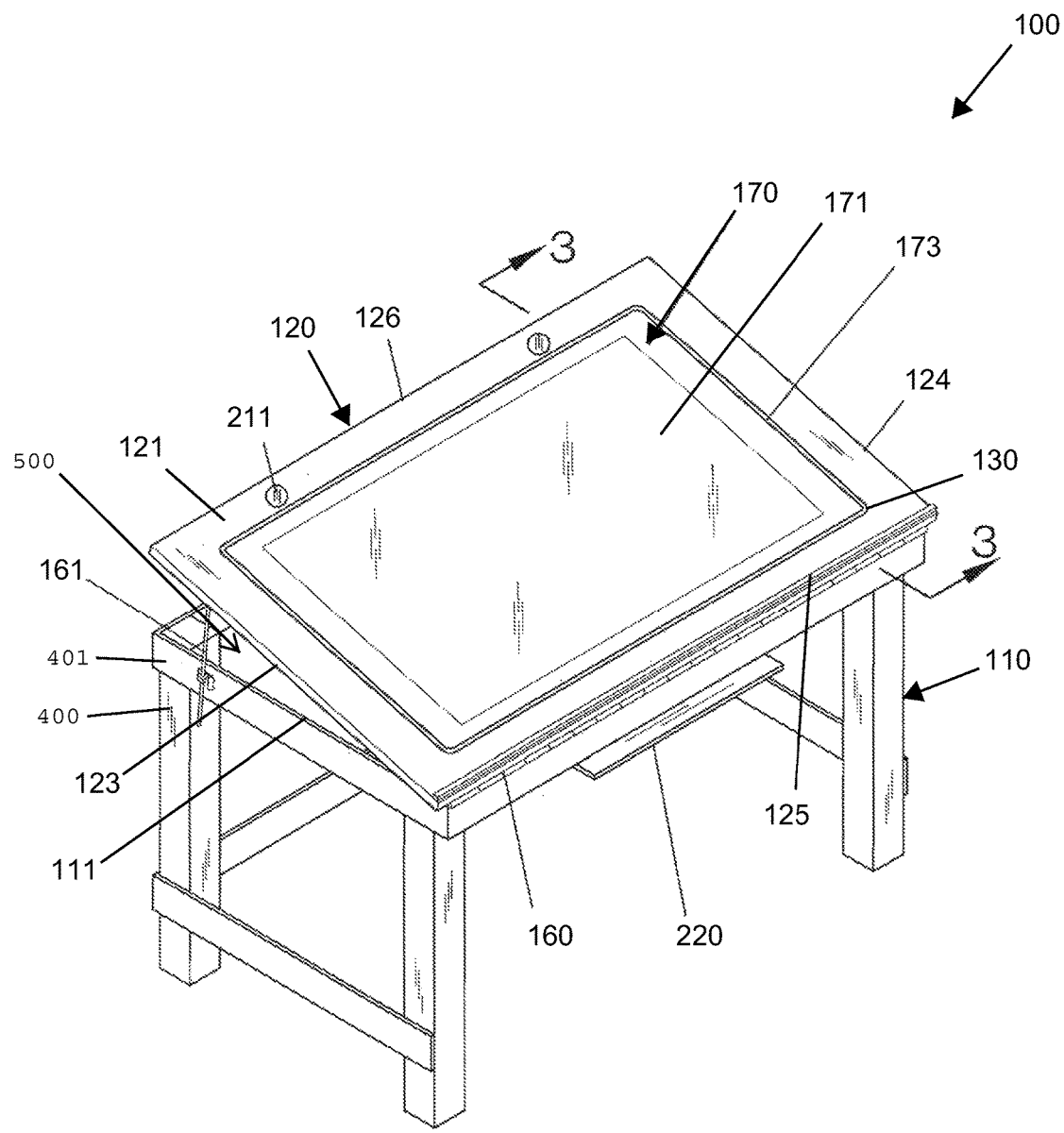
FIG. 1 shows a perspective view of the present invention.
Figure 2:
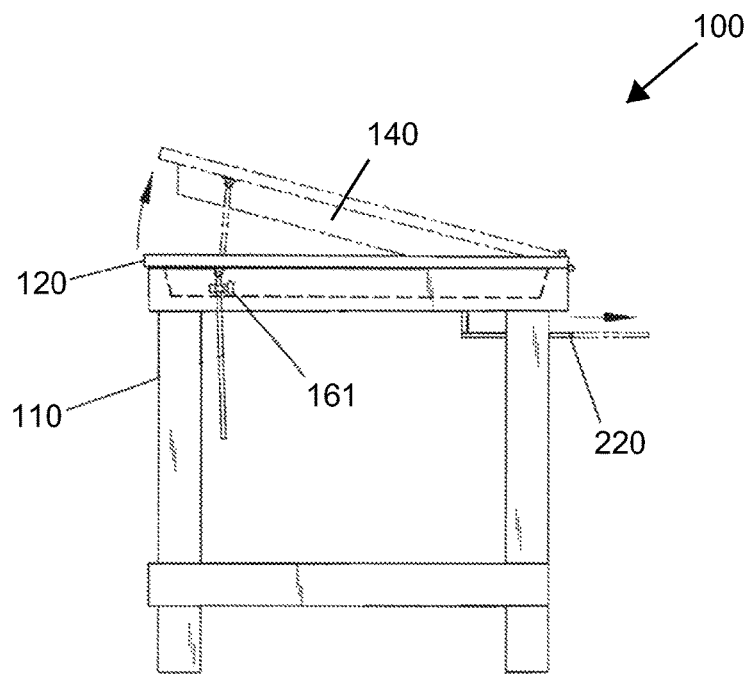
FIG. 2 shows a side view of the present invention.
Figure 3:
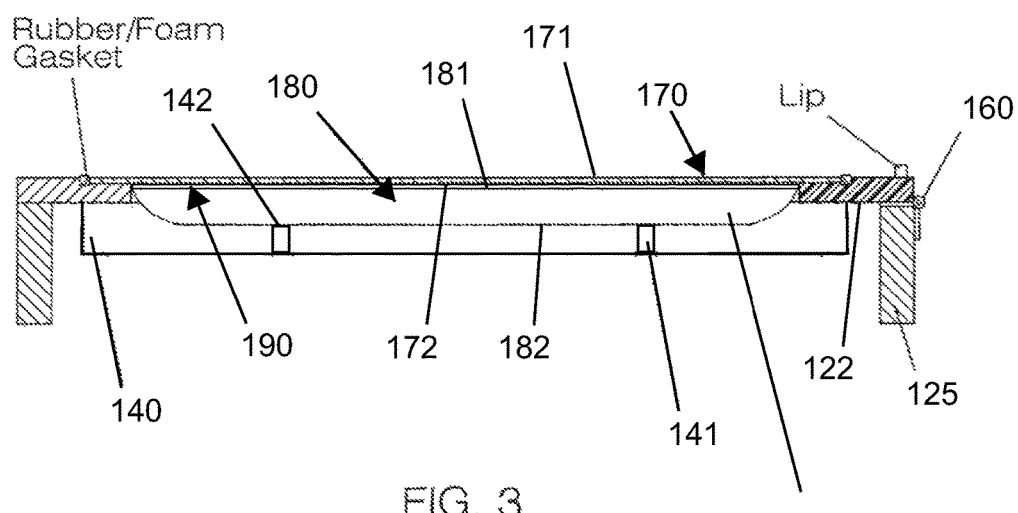
FIG. 3 shows a cross-sectional view of the table top of the present invention.
Figure 4:
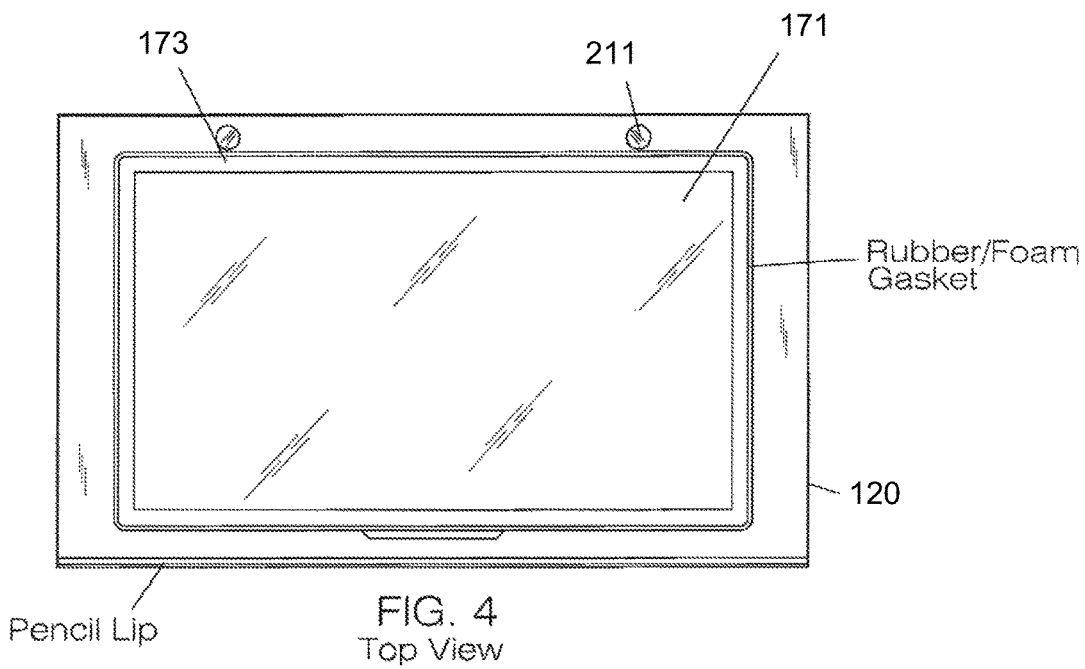
FIG. 4 shows a top view of the present invention.
Figure 5:
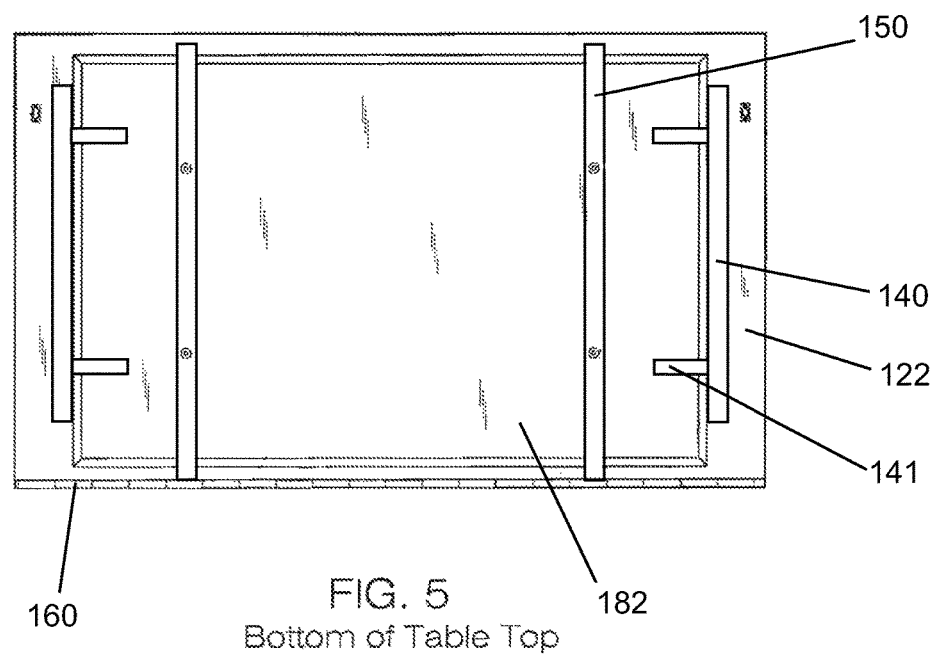
FIG. 5 shows a bottom view of the table top of the present invention.
Figure 6:
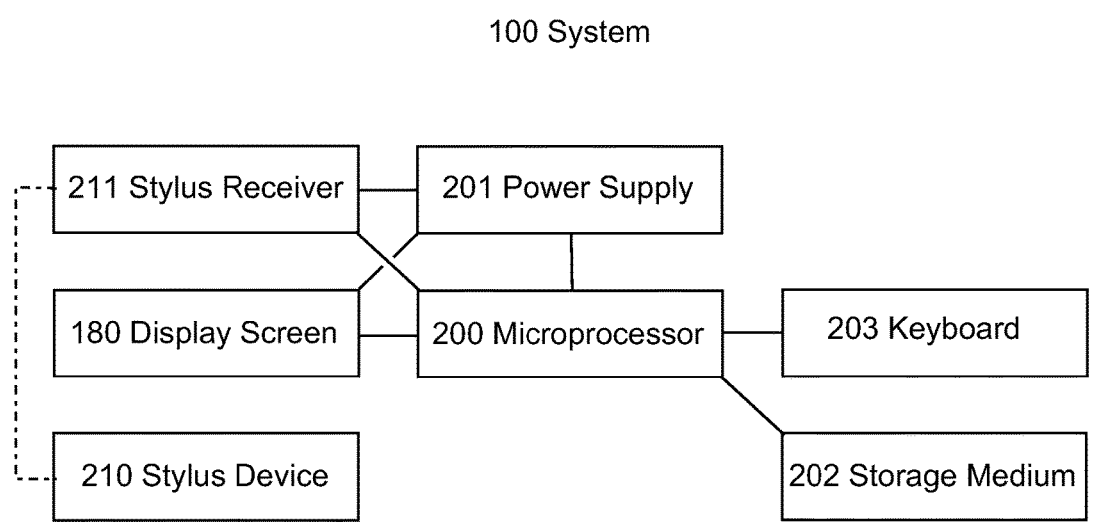
FIG. 6 shows a schematic of the present invention.

Following is a list of elements corresponding to a particular element referred to herein:

100 Paperless blueprint drafting table system
110 Base
111 Base top
120 Table top
121 Table top surface
122 Table bottom surface
123 Table first edge
124 Table second edge
125 Table third edge
126 Table fourth edge
130 Table top aperture
140 Stiffening brace
141 Projection
142 Support ledge
150 Aperture brace
160 Hinge
161 Support arm
170 Window
171 Window top surface
172 Window bottom surface
173 Window ledge
180 Display screen
181 Display screen top surface
182 Display screen bottom surface
190 Display screen gap
200 Microprocessor
201 Power supply
202 Storage medium
203 Keyboard
210 Stylus device
211 Stylus receiver
220 Keyboard tray Referring now to FIG. 1-6, the present invention features a paperless blueprint drafting table system (100) for full-scale viewing, editing, and annotating paperless blueprints. In some embodiments, the system (100) comprises a free standing base (110) having a base top (111). In some embodiments, the base (110) resembles a base commonly used in drafting tables. Drafting tables are well known to those of ordinary skill in the art.

In some embodiments, the system (100) comprises a pivoting table top (120) located on the base top (111) thereon. In some embodiments, the table top (120) comprises a planar table top surface (121). In some embodiments, the table top (120) comprises a table bottom surface (122). In some embodiments, the table top (120) comprises a table first edge (123), a table second edge (124) opposed to the table first edge (123), a table third edge (125), and a table fourth edge (126) opposed to the table third edge (125).

In some embodiments, the table top (120) comprises a table top aperture (130) centrally located therein. In some embodiments, the table top aperture (130) is rectangular, square, polygonal, round, elliptical, or another shape.

In some embodiments, the table top (120) comprises a first linear stiffening brace (140) located on the table bottom surface (122) close to and parallel with the table first edge (123), a second linear stiffening brace (140) located on the table bottom surface (122) close to and parallel with the table second edge (124). In some embodiments, the first linear stiffening brace (140) and the second linear stiffening brace (140) each comprise a projection (141) having a support ledge (142). In some embodiments, each projection (141) extends out and away from the first linear stiffening brace (140) or the second linear stiffening brace (140) toward the table top aperture (130). In some embodiments, the table top (120) comprises a linear aperture brace (150) located on the table bottom surface (122) parallel with the first linear stiffening brace (140) and the second linear stiffening brace (140). In some embodiments, the linear aperture brace (150) traverses the table top aperture (130).

In some embodiments, the stiffening brace (140) along with the projection (141) and the support ledge (142) is critical to the present invention for providing stability to the display screen (180), the window (170) and the table top (120). In some embodiments, aperture brace (150) is critical to the present invention for providing stability to the display screen (180), the window (170) and the table top (120).

In some embodiments, the table top (120) is located at an adjustable angle with respect to the base (110) via a hinge (160) located between the table bottom surface (122) next to the table third edge (125) and the base top (111), and an adjustable support arm (161) located between the table bottom surface (122) and the base top (111). In some embodiment, the table top (120) can be positioned at an angle between 0 and 90 degrees with respect to the base, for example, 5 degrees, 10 degrees, 15 degrees, 20 degrees, or more.

In some embodiments, the system (100) comprises a transparent window (170) located in the table top aperture (130) having a planar window top surface (171) and a window bottom surface (172). In some embodiments, the window top surface (171) is located flush with the table top surface (121) on a window ledge (173) located around a table top aperture inner periphery. In some embodiments, the window (170) is rigid, scratch resistant, and break resistant. In some embodiments, the window is ¼ inch thick. In some embodiments, the window is less than ¼ inch thick. In some embodiments, the window is greater than ¼ inch thick.

In some embodiments, the system (100) comprises a display screen (180) having a display screen top surface (181) and a display screen bottom surface (182). In some embodiments, the display screen (180) is located in the table top aperture (130) of the table top (120). In some embodiments, the display screen top surface (181) is located at an offset from the window bottom surface (172). In some embodiments, a display screen gap (190) is located between the window bottom surface (172) and the display screen top surface (181). The gap between the transparent window and the display screen gap is 1/16 inch or more, for example about ⅛ inch, ¼ inch, ½ inch, etc.

In some embodiments, the display screen gap (190) is a critical feature of the present invention for visibility of the display screen (180) with a correct perspective and proper ventilation of the display screen (180).

In some embodiments, the display screen bottom surface (182) is affixedly located on the supporting ledges (142) of each of the first and second stiffening braces (140). In some embodiments, the display screen bottom surface (182) is affixedly located on a top surface of the linear aperture brace (150). In some embodiments, the present invention comprises two linear aperture braces (150).

In some embodiments, the display screen (180) is operatively connected to a power supply (201) and a microprocessor (200). In some embodiments, the microprocessor (200) is operatively connected to a power supply (201). In some embodiments, a stylus receiver (211) is operatively connected to the power supply (201) and the microprocessor (200). Display screens (180), power supplies (201), microprocessors (200), stylus receivers (211), and stylus devices (210) are well known to those of ordinary skill in the art.

In some embodiments, the display screen (180) displays blueprints through the window (170) for viewing, editing, and annotating via a stylus device (210) operatively interacting with the stylus receiver (211) while interfacing with the window top surface (171) above the display screen (180) through the window (170).

In some embodiments, the window (170) is glass. In some embodiments, the window (170) is tempered.

In some embodiments, the system (100) further comprises a keyboard (203) operatively connected to the microprocessor (200). In some embodiments, a keyboard tray (220) is slidably located on the base (110). In some embodiments, a keyboard tray (220) is slidably located on the table bottom surface (122).

In some embodiments, the display screen bottom surface (182) is not encased to promote ventilation. In some embodiments, this feature is critical to the present invention.

In some embodiments, the display screen gap (190) is less than ¼ inch. In some embodiments, the display screen gap (190) is between ¼ and ½ inch. In some embodiments, the display screen gap (190) is greater than ½ inch.

In some embodiments, the present invention features a paperless blueprint drafting table system (100) for full-scale viewing, editing, and annotating paperless blueprints. In some embodiments, the system (100) consists of a free standing base (110) having a base top (111).

In some embodiments, the system (100) consists of a pivoting table top (120) located on the base top (111) thereon. In some embodiments, the table top (120) consists of a planar table top surface (121). In some embodiments, the table top (120) consists of a table bottom surface (122). In some embodiments, the table top (120) consists of a table first edge (123), a table second edge (124) opposed to the table first edge (123), a table third edge (125), and a table fourth edge (126) opposed to the table third edge (125). In some embodiments, the table top (120) consists of a table top aperture (130) centrally located therein. In some embodiments, the table top (120) consists of a first linear stiffening brace (140) located on the table bottom surface (122) close to and parallel with the table first edge (123), a second linear stiffening brace (140) located on the table bottom surface (122) close to and parallel with the table second edge (124). In some embodiments, the first linear stiffening brace (140) and the second linear stiffening brace (140) each consist of a projection (141) having a support ledge (142). In some embodiments, each projection (141) extends out and away from the first linear stiffening brace (140) or the second linear stiffening brace (140) toward the table top aperture (130). In some embodiments, the table top (120) consists of a linear aperture brace (150) located on the table bottom surface (122) parallel with the first linear stiffening brace (140) and the second linear stiffening brace (140). In some embodiments, the linear aperture brace (150) traverses the table top aperture (130).

In some embodiments, the table top (120) is located at an adjustable angle with respect to the base (110) via a hinge (160) located between the table bottom surface (122) next to the table third edge (125) and the base top (111), and an adjustable support arm (161) located between the table bottom surface (122) and the base top (111).

In some embodiments, the system (100) consists of a transparent window (170) located in the table top aperture (130) having a planar window top surface (171) and a window bottom surface (172). In some embodiments, the window top surface (171) is located flush with the table top surface (121) on a window ledge (173) located around a table top aperture inner periphery. In some embodiments, the window (170) is rigid, scratch resistant, and break resistant.

In some embodiments, the system (100) consists of a display screen (180) having a display screen top surface (181) and a display screen bottom surface (182). In some embodiments, the display screen (180) is located in the table top aperture (130) of the table top (120). In some embodiments, the display screen top surface (181) is located at an offset from the window bottom surface (172). In some embodiments, a display screen gap (190) is located between the window bottom surface (172) and the display screen top surface (181). In some embodiments, the display screen bottom surface (182) is affixedly located on the supporting ledges (142) of each of the first and second stiffening braces (140). In some embodiments, the display screen bottom surface (182) is affixedly located on a top surface of the linear aperture brace (150).

In some embodiments, the display screen (180) is operatively connected to a power supply (201) and a microprocessor (200). In some embodiments, the microprocessor (200) is operatively connected to a power supply (201). In some embodiments, a stylus receiver (211) is operatively connected to the power supply (201) and the microprocessor (200).

In some embodiments, the display screen (180) displays blueprints through the window (170) for viewing, editing, and annotating via a stylus device (210) operatively interacting with the stylus receiver (211) while interfacing with the window top surface (171) above the display screen (180) through the window (170).

Without wishing to limit the invention to any particular theory or mechanism, it is believed that the present invention is unique because some of the previous prior arts are dependent on paper, and work as a digitizer from the paper; whereas with the present system, there is no paper actually needed. The blueprint files are generated by a draftsman on a program like AutoCAD, which the present system can work directly with or can be transmitted to other file types and modified without ever printing paper at all.

As used herein, the term "about" refers to plus or minus 10% of the referenced number.

The disclosures of the following U.S. Patents are incorporated in their entirety by reference herein: U.S. Pat. No. 4,408,850; U.S. Pat. No. 4,451,895; U.S. Pat. No. 4,490,777; U.S. Pat. No. 4,716,542; U.S. Pat. No. 4,811,243; U.S. Pat. No. 5,341,305; U.S. Pat. No. 5,508,720; U.S. Pat. No. 6,075,502; U.S. Pat. No. 6,766,282; U.S. Pat. No. 6,805,237; U.S. Pat. No. 6,980,088; U.S. Pat. No. 7,870,937 B1; U.S. Patent Pub. No. 2004/0123780; U.S. Patent Pub. No. 2004/0186818; U.S. Patent Pub. No. 2005/0047074; U.S. Patent Pub. No. 2005/0140677; U.S. Patent Pub. No. 2007/0075977; U.S. Patent Pub. No. 2010/0090075; U.S. Patent Pub. No. 2010/0103167; and U.S. Pat. No. D 403,005.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A paperless blueprint drafting table system (100) for full-scale viewing, editing, and annotating paperless blueprints, wherein the system (100) comprises:
   (a) a free standing base (110) having a base top (111), the base top being a rectangular frame (401) having a center opening (500), wherein four legs (400) extend outwardly from the frame, the four legs extend in the same direction and away from the frame;
   (b) a pivoting table top (120) disposed on the base top (111) thereon, wherein the table top (120) comprises:
      (i) a planar table top surface (121), the table top surface rests on the base top (111);
      (ii) a table bottom surface (122),
      (iii) a table first edge (123), a table second edge (124) opposed to the table first edge (123), a table third edge (125), and a table fourth edge (126) opposed to the table third edge (125),
      (iii) a table top aperture (130) centrally disposed therein,
      (iv) a first linear stiffening brace (140) disposed on the table bottom surface (122) proximal to and parallel with the table first edge (123), a second linear stiffening brace (140) disposed on the table bottom surface (122) proximal to and parallel with the table second edge (124), wherein the first linear stiffening brace (140) and the second linear stiffening brace (140) each comprise a projection (141) having a support ledge (142), wherein each projection (141) extends out and away from the first linear stiffening brace (140) or the second linear stiffening brace (140) toward the table top aperture (130), and
      (v) a linear aperture brace (150) disposed on the table bottom surface (122) parallel with the first linear stiffening brace (140) and the second linear stiffening brace (140), wherein the linear aperture brace (150) traverses the table top aperture (130);
   wherein the table top (120) is disposed at an adjustable angle with respect to the base (110) via a hinge (160) disposed between the table bottom surface (122) adjacent to the table third edge (125) and the base top (111), and an adjustable support arm (161) disposed between the table bottom surface (122) and the base top (111);

(c) a transparent window (170) disposed in the table top aperture (130) having a planar window top surface (171) and a window bottom surface (172), wherein the window top surface (171) is disposed flush with the table top surface (121) on a window ledge (173) disposed around a table top aperture inner periphery, wherein the window (170) is rigid, scratch resistant, and break resistant;

(d) a display screen (180) having a display screen top surface (181) and a display screen bottom surface (182), wherein the display screen (180) is disposed in the table top aperture (130) of the table top (120), wherein the display screen top surface (181) is disposed at an offset from the window bottom surface (172), the display screen is part of a multimedia device (600); and (e) a display screen gap (190) disposed between the window bottom surface (172) and the display screen top surface (181), wherein the display screen bottom surface (182) is affixedly disposed on the supporting ledges (142) of each of the first and second stiffening braces (140), wherein the display screen bottom surface (182) is affixedly disposed on a top surface of the linear aperture brace (150), the gap between the transparent window and the display screen gap is 1/16 inch or more;

wherein the display screen (180) and multimedia device (600) are operatively connected to a power supply (201) and a microprocessor (200), wherein the microprocessor (200) is operatively connected to a power supply (201), wherein a stylus receiver (211) is operatively connected to the power supply (201) and the microprocessor (200);

wherein the display screen (180) displays blueprints through the window (170) for viewing, editing, and annotating via a stylus device (210) operatively interacting with the stylus receiver (211) while interfacing with the window top surface (171) above the display screen (180) through the window (170).

2. The system (100) of claim 1, wherein the window (170) is glass.

3. The system (100) of claim 2, wherein the window (170) is tempered.

4. The system (100) of claim 1, further comprising a keyboard (203) operatively connected to the microprocessor (200).

5. The system (100) of claim 1, wherein a keyboard tray (220) is slidably disposed on the base (110).

6. The system (100) of claim 1, wherein a keyboard tray (220) is slidably disposed on the table bottom surface (122).

7. The system (100) of claim 1, wherein the display screen bottom surface (182) is not encased to promote ventilation.

8. The system (100) of claim 1, wherein the display screen gap (190) is less than 1/4 inch.

9. The system (100) of claim 1, wherein the display screen gap (190) is between 1/4 and 1/2 inch.

10. The system (100) of claim 1, wherein the display screen gap (190) is greater than 1/2 inch.

11. A paperless blueprint drafting table system (100) for full-scale viewing, editing, and annotating paperless blueprints, wherein the system (100) consists of:

(a) a free standing base (110) having a base top (111), the base top being a rectangular frame (401) having a center opening (500), wherein four legs (400) extend outwardly from the frame, the four legs extend in the same direction and away from the frame;

(b) a pivoting table top (120) disposed on the base top (111) thereon, wherein the table top (120) consists of:
 (i) a planar table top surface (121), the table top surface rests on the base top (111);
 (ii) a table bottom surface (122),
 (iii) a table first edge (123), a table second edge (124) opposed to the table first edge (123), a table third edge (125), and a table fourth edge (126) opposed to the table third edge (125),
 (iii) a table top aperture (130) centrally disposed therein,
 (iv) a first linear stiffening brace (140) disposed on the table bottom surface (122) proximal to and parallel with the table first edge (123), a second linear stiffening brace (140) disposed on the table bottom surface (122) proximal to and parallel with the table second edge (124), wherein the first linear stiffening brace (140) and the second linear stiffening brace (140) each consist of a projection (141) having a support ledge (142), wherein each projection (141) extends out and away from the first linear stiffening brace (140) or the second linear stiffening brace (140) toward the table top aperture (130), and
 (v) a linear aperture brace (150) disposed on the table bottom surface (122) parallel with the first linear stiffening brace (140) and the second linear stiffening brace (140), wherein the linear aperture brace (150) traverses the table top aperture (130);

wherein the table top (120) is disposed at an adjustable angle with respect to the base (110) via a hinge (160) disposed between the table bottom surface (122) adjacent to the table third edge (125) and the base top (111), and an adjustable support arm (161) disposed between the table bottom surface (122) and the base top (111);

(c) a transparent window (170) disposed in the table top aperture (130) having a planar window top surface (171) and a window bottom surface (172), wherein the window top surface (171) is disposed flush with the table top surface (121) on a window ledge (173) disposed around a table top aperture inner periphery, wherein the window (170) is rigid, scratch resistant, and break resistant; and (d) a display screen (180) having a display screen top surface (181) and a display screen bottom surface (182), wherein the display screen (180) is disposed in the table top aperture (130) of the table top (120), wherein the display screen top surface (181) is disposed at an offset from the window bottom surface (172), the display screen is part of a multimedia device; and (e) a display screen gap (190) is disposed between the window bottom surface (172) and the display screen top surface (181), wherein the display screen bottom surface (182) is affixedly disposed on the supporting ledges (142) of each of the first and second stiffening braces (140), wherein the display screen bottom surface (182) is affixedly disposed on a top surface of the linear aperture brace (150), the gap between the transparent window and the display screen gap is 1/16 inch or more;

wherein the display screen (180) and the multimedia (600) device are operatively connected to a power supply (201) and a microprocessor (200), wherein the microprocessor (200) is operatively connected to a power supply (201), wherein a stylus receiver (211) is operatively connected to the power supply (201) and the microprocessor (200);

wherein the display screen (180) displays blueprints through the window (170) for viewing, editing, and annotating via a stylus device (210) operatively interacting with the stylus receiver (211) while interfacing with the window top surface (171) above the display screen (180) through the window (170).

* * * * *